(12) United States Patent
Bremmer et al.

(10) Patent No.: US 8,613,252 B2
(45) Date of Patent: Dec. 24, 2013

(54) CO-CURING REUSABLE ELASTOMERIC CAUL PLATE

(75) Inventors: Jonathan Bremmer, Glastonbury, CT (US); Jeffrey G. Sauer, Woodbury, CT (US); Edward Joseph Fabian, Oxford, CT (US); Robert A. Lacko, Oxford, CT (US); Neil W. Cawthra, Shelton, CT (US); Christian A. Rogg, New Milford, CT (US); Paul H. Denavit, Woodbridge, CT (US); William E. Hovan, III, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 179 days.

(21) Appl. No.: 13/026,794

(22) Filed: Feb. 14, 2011

(65) Prior Publication Data

US 2012/0204741 A1 Aug. 16, 2012

(51) Int. Cl.
*B32B 37/00* (2006.01)

(52) U.S. Cl.
USPC ............ 100/295; 156/60; 156/196; 156/222; 156/285; 156/499; 156/583.1; 264/257; 264/258; 264/313; 264/510; 264/511; 425/405.1

(58) Field of Classification Search
USPC ............ 100/295; 156/60, 196, 222, 285, 499; 156/583.1; 264/257, 258, 313, 510, 511; 425/405.1
See application file for complete search history.

(56) References Cited

U.S. PATENT DOCUMENTS

| | | | |
|---|---|---|---|
| 5,356,586 A * | 10/1994 | Dublinski et al. | 264/258 |
| 5,484,277 A * | 1/1996 | Lindsay | 425/388 |
| 5,597,435 A * | 1/1997 | Desautels et al. | 156/245 |
| 5,876,546 A | 3/1999 | Cloud | |
| 6,090,335 A * | 7/2000 | McClure et al. | 264/510 |
| 6,197,146 B1 * | 3/2001 | Sucic et al. | 156/245 |
| 6,431,850 B1 * | 8/2002 | Evans et al. | 425/470 |
| 6,692,681 B1 | 2/2004 | Lunde | |
| 6,696,009 B2 * | 2/2004 | Davis | 264/510 |
| 6,739,861 B2 * | 5/2004 | Cournoyer et al. | 425/520 |
| 7,284,726 B2 * | 10/2007 | Fabian et al. | 244/17.11 |
| 7,534,387 B2 * | 5/2009 | Zenkner et al. | 264/313 |
| 2008/0220112 A1 * | 9/2008 | Waldrop et al. | 425/405.1 |
| 2009/0142196 A1 * | 6/2009 | Gerhardt et al. | 416/223 R |

FOREIGN PATENT DOCUMENTS

EP 1092529 * 8/2000
EP 1092529 A1 * 4/2001

* cited by examiner

*Primary Examiner* — Dana Ross
*Assistant Examiner* — Onekki Jolly
(74) *Attorney, Agent, or Firm* — Cantor Colburn LLP

(57) ABSTRACT

A caul plate system for a laminate structure includes a plurality of layers of curable caul plies disposed over a laminate structure and substantially conforming to a surface of the laminate structure. A resin is applied to the plurality of layers of caul plies. Co-curing of the plurality of layers of caul plies with the laminate structure hardens the plurality of layers of caul plies such that a normal pressure is applied to the laminate structure during cure of the laminate structure.

13 Claims, 1 Drawing Sheet

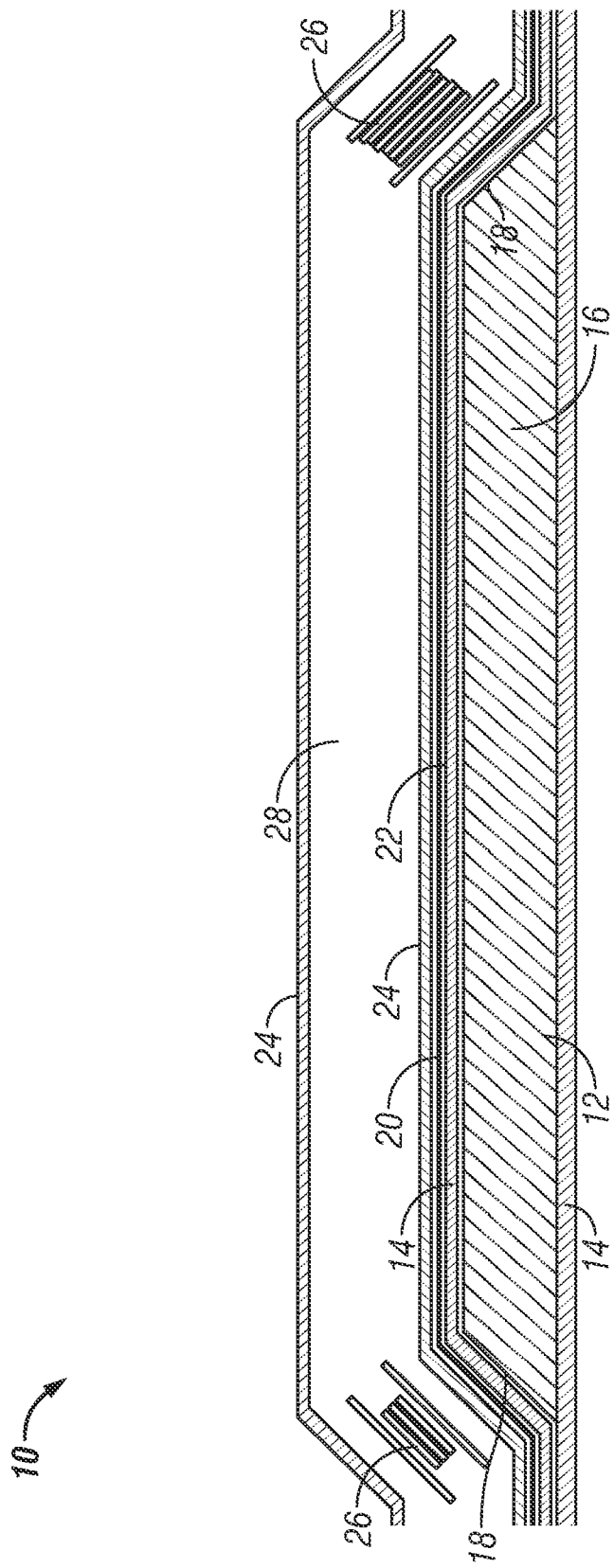

CO-CURING REUSABLE ELASTOMERIC CAUL PLATE

This invention was made with government support with the United States Navy under Contract No.: N00019-06-C-0081. The government therefore has certain rights in this invention.

BACKGROUND OF THE INVENTION

The subject matter disclosed herein relates to the manufacture of honeycomb composite structures. More specifically, the subject disclosure relates to caul plates used in the manufacture of honeycomb composite structures.

Caul plates are typically used in the fabrication of composite laminate structures, commonly in those that have a honeycomb core. A typical caul plate is metal and of the same size and shape as the composite lay-up. The caul plate is used in contact with the lay-up during the curing process to transmit normal pressure and provide a smooth surface on the finished laminate structure.

Under typical curing conditions however, a pressure exerted by the typical metal caul plate causing crushing and/or deformation of the honeycomb core, resulting in a defective laminate structure. Further, metal caul plates must be precision milled to the desired shape and size, which is a costly and time consuming process. Additionally, whenever a structure's shape is changed, another new caul plate must be made further adding cost.

BRIEF DESCRIPTION OF THE INVENTION

According to one aspect of the invention, a caul plate system for a laminate structure includes a plurality of layers of curable caul plies disposed over a laminate structure and substantially conforming to a surface of the laminate structure. A resin is applied to the plurality of layers of caul plies. Co-curing of the plurality of layers of caul plies with the laminate structure hardens the plurality of layers of caul plies such that a normal pressure is applied to the laminate structure during cure of the laminate structure.

According to another aspect of the invention, a method of forming a caul plate for a laminate structure includes placing a plurality of layers of caul plies over the laminate structure prior to curing of the laminate structure. A volume of resin is applied to the plurality of caul plies. The laminate structure is cured via a desired cure cycle, and the plurality of caul plies are co-cured with the laminate structure, thereby providing a caul plate to ensure a normal pressure is applied to the laminate structure during cure of the laminate structure.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The FIGURE is a schematic view of an embodiment of a caul plate system for a laminate structure.

The detailed description explains embodiments of the invention, together with advantages and features, by way of example with reference to the drawings.

DETAILED DESCRIPTION OF THE INVENTION

Shown in the FIGURE is an embodiment of a caul plate 10 for a composite laminate 12. The laminate 12 includes a plurality of plies 14 arranged on either or both sides of a core structure 16. In some embodiments, the core structure 16 is a honeycomb core shape. The core structure 16 may include one or more thickness changes or ramps 18 where a thickness of the core structure 16 increases or decreases.

The caul plate 10 is placed over the laminate 12 prior to curing of the laminate 12 via, for example, an autoclave which controls temperature and pressure applied to the laminate 12. The caul plate 10 includes a flexible sheet 20 which in some embodiments is formed from a rubber or rubber/silicone combination. The flexible sheet 20 is placed over the laminate 12, and because of the flexibility of the flexible sheet 20, substantially conforms with an adjacent surface 22 of the laminate 12. One or more caul plies 24 are placed over the flexible sheet 20. In some embodiments, the caul plies 24 comprise, for example, fiberglass or graphite, in a pre-impregnated or prepreg form in which the caul plies 24 include a resin pre-impregnated therein. In other embodiments, the caul plies 24 may be put in place using a wet layup process where a resin is poured to roll over the caul plies 24 after the caul plies 24 are placed over the flexible sheet 20. The caul ply 24 material is configured to cure prior to the laminate 12 when subjected to a cure cycle for the laminate 12 in the autoclave. In some embodiments, additional caul plies 24 or other reinforcing plies 26 are arranged over the ramps 18 to provide additional rigidity in those areas.

The entire structure, including the laminate 12, flexible sheet 20 and caul plies 24 are bagged for cure. The caul plies 24 are hardened into a caul laminate 28 by co-curing along with the laminate 12 utilizing the same cure cycle as for the laminate 12. As stated above, the caul laminate 28 is configured to cure before the laminate 12 cures, so when hardened the caul laminate 28 transmits a normal pressure to the laminate 12 to ensure even curing of the laminate 12, to prevent crushing and/or other deformation of the core structure 16. Further, in some embodiments, use of the co-cured caul laminate 28 allows for curing of the laminate 12 at higher pressures than a traditional metal caul plate, thus resulting in a faster cure of the laminate 12. While in the embodiment shown, the caul laminate 28 is used over the entirety of the laminate 12, it is to be appreciated that, in other embodiments the caul laminate 28 may be used in localized areas, in combination with a traditional metal caul plate is so desired.

Once the cure cycle for the laminate 12 is completed, the caul laminate 28 and the flexible sheet 20 may be reused in processing additional parts. This method of fabrication of a caul plate 10, based on an actual laminate 12 surface, is more flexible, quicker, and more cost effective than fabrication of traditional metal caul plates which must be formed or milled based on engineering models, computer data, or the like. If the structure of the laminate 12 is changed for whatever reason, a revised caul plate 10 can easily be fabricated by co-curing a new caul laminate 28 with the laminate 12 of the changed configuration.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be under-

The invention claimed is:

1. A caul plate system for curing of a laminate structure comprising:
   a plurality of layers of curable caul plies disposed over a plurality of uncured plies of a laminate structure, substantially conforming to a surface of the laminate structure; and
   a resin applied to the plurality of layers of caul plies;
   wherein co-curing the plurality of layers of caul plies with the laminate structure hardens the plurality of layers of caul plies prior to the plurality of uncured plies of the laminate structure such that a normal pressure is applied to the laminate structure during cure of the laminate structure.

2. The caul plate system of claim 1, further comprising a flexible sheet interposed between the laminate structure and the plurality of layers of caul plies.

3. The caul plate system of claim 2, wherein the flexible sheet is formed of a rubber or rubber/silicone combination.

4. The caul plate system of claim 1, further comprising one or more reinforcing plies interposed in the plurality of layers of caul plies.

5. The caul plate system of claim 4, wherein the one or more reinforcing plies are disposed at a core ramp of the laminate structure.

6. The caul plate system of claim 1, wherein the caul plies are fiberglass or graphite material.

7. The caul plate system of claim 1, wherein the caul plies are pre-impregnated with resin.

8. A method of forming a caul plate for a laminate structure comprising:
   placing a plurality of layers of caul plies over a plurality of uncured plies of a laminate structure prior to curing of the laminate structure;
   applying a volume of a resin to the plurality of caul plies;
   curing the laminate structure via a desired cure cycle; and
   co-curing the plurality of caul plies with the laminate structure such that the plurality of caul plies cure prior to cure of the laminate structure, thereby providing a caul plate to ensure a normal pressure is applied to the laminate structure during cure of the laminate structure.

9. The method of claim 8, further comprising interposing a flexible sheet between the plurality of caul plies and the laminate structure.

10. The method of claim 8, further comprising interposing one or more reinforcing plies between layers of the caul plies.

11. The method of claim 10, further comprising locating the reinforcing plies at a core ramp of the laminate structure.

12. The method of claim 8, wherein the plurality of caul plies are pre-impregnated with resin.

13. The method of claim 8 wherein the curing of the caul plies and the laminate structure takes place in an autoclave.

* * * * *